May 19, 1925.
L. L. KORACH
1,537,951
MECHANISM FOR CLEANING WINDSHIELDS FOR AUTOMOBILES OR SIMILAR DEVICES
Filed Feb. 17, 1921
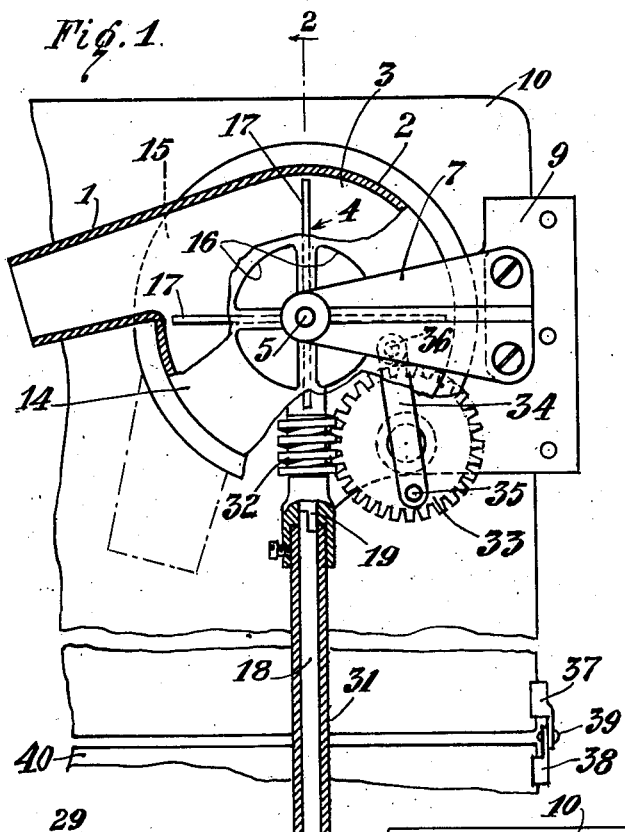
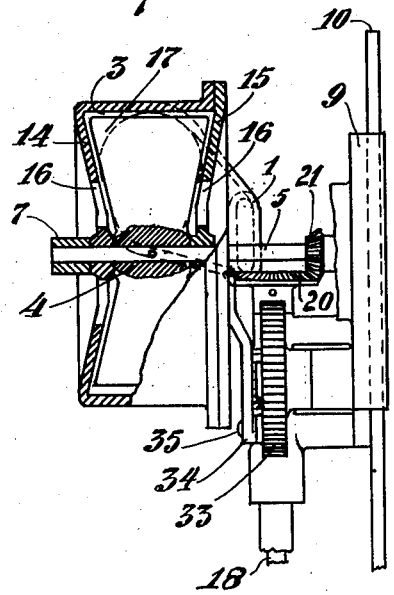
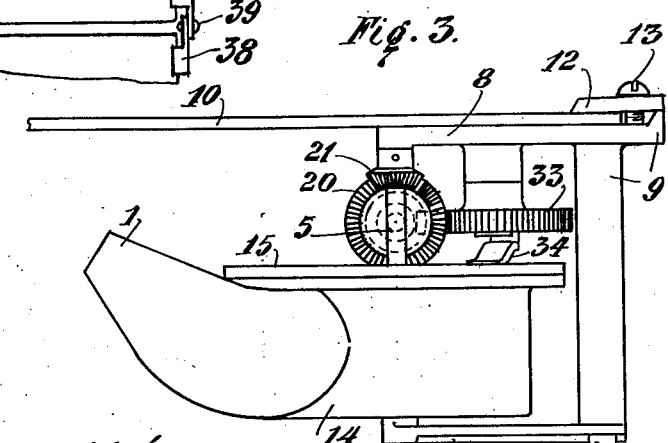
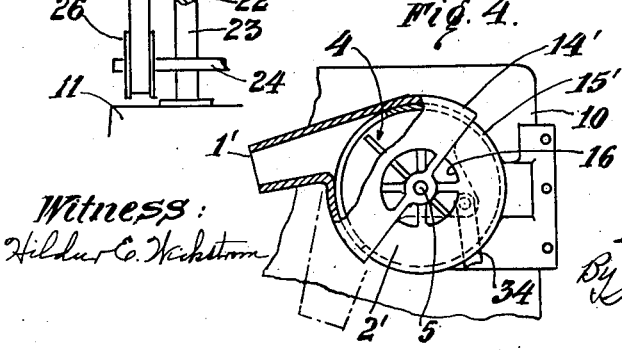
Witness:
Hilder C. Wickstrom
Inventor:
Louis L. Korach
By Harry Irwin Cromer
Attorney Patented May 19, 1925.

1,537,951

UNITED STATES PATENT OFFICE.

LOUIS L. KORACH, OF CHICAGO, ILLINOIS.

MECHANISM FOR CLEANING WINDSHIELDS FOR AUTOMOBILES OR SIMILAR DEVICES.

Application filed February 17, 1921. Serial No. 445,818.

*To all whom it may concern:*

Be it known that I, LOUIS L. KORACH, a citizen of the United States, residing in Chicago, in the county of Cook and State of Illinois, have invented certain new and useful Improvements in Mechanisms for Cleaning Windshields for Automobiles or Similar Devices, of which the following is a specification.

This invention relates to that class of mechanisms for cleaning wind shields or windows of automobiles or similar vehicles, in which a nozzle or similar air conduit is mounted in position to discharge a current of air against the surface of the glass or wind shield, and means is provided for forcing a current of air through such nozzle or conduit and against the glass to clean the same.

The principal object of the invention is to provide a simple, economical and efficient mechanism for cleaning wind shields or windows of automobiles, or similar vehicles.

Other and further objects of the invention will appear from an examination of the following description and claims, and from an inspection of the accompanying drawings, which are made a part of this specification.

The invention consists in the features, combinations of elements, arrangement of parts, and details of construction herein described and claimed.

In the accompanying drawings, Figure 1 is a view in front elevation of a mechanism constructed in accordance with my invention, showing the same mounted in operative position on a wind shield of an automobile, and showing the fan operatively connected with a source of power, which in this instance is the engine or a driven part of the mechanism of an automobile;

Fig. 2 is a view in side elevation with a part of the supporting bracket and fan-containing casing broken away, and with the fan and the principal part of the fan casing shown in central vertical section taken on line 2 of Fig. 1 looking in the direction indicated by the arrow;

Fig. 3 is a plan view of the mechanism shown in Figs. 1 and 2; and

Fig. 4, is a modification, showing a nozzle pivotally mounted and adapted to be reciprocated or rocked with respect to the fan casing or with respect to the means for forcing a current of air through the nozzle. The nozzle is connected with a pitman by means of an extension fixed to the nozzle, said extension and pitman being shown in broken lines in said figure.

In constructing an improved mechanism for cleaning wind shields or windows for automobiles or similar vehicles or devices, I provide a nozzle 1 which is by preference reciprocatingly or rockingly mounted in position to discharge a current of air against the surface of the wind shield or glass to be operated upon. In the form of the device shown in Figs. 1 to 3 inclusive of the drawings, the nozzle 1 is fixed to and adapted to communicate with the interior of a hollow casing 2 forming an air compartment or passage 3 in which is mounted a rotary fan 4 which is fixed to a rotary shaft 5. The side walls of the nozzle and casing are provided with suitable transverse openings through which the shaft 5 extends in transverse relation to the casing and nozzle. The shaft 5 has its opposite ends journaled in the arms 7 and 8 of a supporting bracket 9 which is mounted upon and removably secured in fixed relation to the marginal portion of a wind shield 10 of an automobile, or similar vehicle 11, by means of a clamping jaw 12 and clamping screws 13, or similar suitable securing means adapted to support the nozzle or cleaning mechanism in operative position upon the wind shield or device to be operated upon. The casing 2, shown in Figs. 1 to 3, inclusive, comprises opposite side walls or heads 14 and 15 which are, by preference, connected by a peripheral wall with which the nozzle 1, in the form shown in said figures, is integral. The side walls or heads 14 and 15 are mounted on the shaft 5 which is fixed to and rotates with the fan, and forms the axle of the fan. The side walls 14 and 15 thus serve to pivotally support the nozzle on the fan axle, and are provided with air inlet openings 16 communicating with the interior fan-containing compartment or air compartment formed by the casing. One wall of the nozzle projects tangentially from the peripheral wall of the casing 2, and may form an integral projecting portion or extension of said peripheral wall of the casing, the other walls of the nozzle being so formed that the nozzle is properly tapered and in such position with respect to the location and direction of the path of movement of the fan blades 17, that the air will be forced through the nozzle in a strong current by the rapid rotation of the fan. The nozzle is also so formed that its side walls and the tapered air passage formed by the nozzle are disposed at an oblique angle with respect to the adjacent side surface of the glass or wind shield to be cleaned, thus causing the current of air forced through the nozzle from the interior of the casing to strike the surface of the glass or wind shield at an oblique angle with respect to the plane of said surface. The nozzle is also caused to reciprocate or rock upon its axis which is concentric with the axial center of the fan axle 5 on which the nozzle, and,—in the form of the device shown in Figs. 1 to 3 inclusive,—the connected nozzle and casing are pivotally supported. The shaft or fan axle 5, which forms the pivot for the nozzle and casing and is mounted upon the glass or wind shield by means of the bracket 9 in which the opposite ends of the shaft are journaled as already described, is located on the outside of and in perpendicular relation to the adjacent outer side surface of the wind shield or glass to be cleaned. The nozzle and casing are thus reciprocatingly and pivotally mounted so as to reciprocate or rock in a plane parallel to the plane of the glass or wind shield. The nozzle is shown in raised position in full lines in Fig. 1, and in lowered position in broken lines, in said figure.

The driving mechanism by means of which the nozzle, or nozzle and casing are reciprocated, and the fan rotated so as to force a current of air through the reciprocating or rocking nozzle in such a manner as to cause the current of air to clean a desired area of the surface of the glass by driving rain or moisture, dust or other obstructions therefrom, is, by preference, operatively connected with a moving part of the engine or mechanism of the automobile or vehicle on which the wind shield and the cleaning device are supported.

In order to provide suitable driving means for operating the fan and reciprocating the nozzle, or nozzle and casing, and adapted to enable the wind shield to be adjusted to different inclined positions or to vertical position as desired without interfering with the efficiency of operation of the device, I provide a flexible shaft 18, which may be of any desired ordinary and well known or suitable form; and to the upper end of this flexible shaft is detachably secured a stub shaft 19 which is journaled in suitable bearings in the supporting bracket 9, already described. On the upper end of the stub shaft 19 is fixed a bevel gear wheel 20 which is in toothed engagement with a bevel pinion 21 fixed to the axle 5 which is fixed to the fan. The opposite end of the flexible shaft 18 is journaled in a suitable bearing 22 in the end of a supporting bracket 23, which is fixed to a suitable part of the frame 11 of an automobile.

And said last mentioned end of said flexible shaft is operatively connected with a source of power, such, for instance, as the engine shaft or crank shaft 24 of the automobile engine, by suitable means which may be in the form of a belt pulley 25 fixed to the lower end of the flexible shaft 18, a belt pulley 26 fixed to the driven shaft or engine shaft 24, a pulley 27 fixed to the rotative shaft 28 for driving the fan 29 for air-cooling the engine of which the shaft 24 forms a part, and a belt 30 mounted on the pulleys 26 and 27 and in frictional engagement with and adapted to rotate the pulley 25, and thereby the flexible shaft 18 and fan 4 of the cleaning device above described. The flexible shaft 18 may be covered by a flexible shield or covering 31 mounted at its opposite ends in suitable supports, and adapted to permit the flexible shaft to rotate therein. A worm 32 is fixed to the stub shaft 19 at the upper end of the flexible shaft 18, so as to be driven by the latter; and a worm wheel 33 is rotatively mounted upon the supporting bracket 9, and operatively connected with the reciprocating or rocking nozzle 1 and casing 2 by means of a connecting rod or pitman 34, one end of which is pivotally connected with the worm wheel 33 by means of wrist pin or crank pin 35 on the worm wheel, and the other end of which is pivotally connected with the side wall member 15 which supports the nozzle on the shaft 5, by means of a wrist pin 36 mounted on the side wall 15 and located on the opposite side of the axle 5 from the nozzle 1 to be reciprocated or rocked.

From the foregoing description it will be readily understood that the rotation of the flexible driving shaft 18 will drive the rotary fan 4, and will operate the worm and worm wheel mechanism by means of which the flexible shaft is operatively connected with the reciprocating or pivoted nozzle and casing, so as to cause the nozzle to be reciprocated or rocked during the operation of forcing the current of air through the nozzle to clean the glass or wind shield on which the nozzle is supported.

In the form of the device shown in Fig. 4, the nozzle 1' is fixed to or formed in one integral piece with a wall or head 14' having a peripheral wall portion integral with the nozzle and partially encircling the periphery of a fixed casing 2' mounted on or adjacent to the wind shield, and having a wall or head 15' opposite to the head 14'. The nozzle 1' and its head 14' are mounted on the shaft 5 which is fixed to the fan 4 and forms a rotative axle for the fan. And the nozzle 1' has an extension or projecting portion formed integral therewith and pivotally connected with an operating rod or pitman 34, as shown in broken lines in said Fig. 4. In this form of the device the casing is not required to reciprocate, and is adapted to form the support for the shaft which forms the axle for the fan, as well as for the mechanism for operatively connecting the fan shaft with the flexible or driving shaft 18, and for connecting the driving shaft with the nozzle. It is obvious that the nozzle shown in Fig. 4 is adapted to reciprocate or oscillate upon its axis formed by the shaft 5, and with respect to the stationary casing 2' in which the fan is rotatively mounted. And the same worm and worm wheel and pitman rod mechanism already described, are adapted to be employed for reciprocating the nozzle with respect to the stationary fan casing shown in Fig. 4.

In Fig. 1, the glass wind shield member 10 is shown adjustably mounted, so as to permit it to be adjusted to different inclined positions or to vertical position. It is supported adjustably upon or with respect to the lower wind shield member or glass 40 by means of hinges fixed to the side margins of the wind shield, said supporting hinges consisting of upper hinge members 37 secured to the opposite side margins or lower corners of the upper wind shield member 10, and lower hinge members 38 secured to the corresponding side margins or upper corners of the lower wind shield member 40, and pivotally connected with the upper hinge members 37 by means of pivot pins or rods 39. The wind shield may of course be of any desired ordinary and well known form; but it is important that the fan mounted on the adjustable or hinged wind shield member be provided with driving means mounted independently of the hinged wind shield member, and with suitable connecting means such as the flexible driving shaft, connected with the driving means and with the fan and adapted to rotate the fan in any position into which the wind shield member 10 and the fan supported thereon may be adjusted.

I claim:

1. In a device of the class described, the combination with the wind shield of a motor vehicle and a nozzle supported in movable relation to the wind shield and in position to discharge a current of air against and at an angle with respect to the surface of the wind shield, of means for forcing a current of air through the nozzle and against the surface of the wind shield, and means for automatically moving the mouth of the nozzle with respect to the wind shield.

2. In a mechanism of the class described, the combination of a reciprocating nozzle provided with supporting means adapted to be attached to the wind shield of a motor vehicle, for supporting said nozzle in position to discharge a current of air against and at an angle with respect to the surface of said wind shield, means for forcing a current of air through the nozzle, and means operatively connected with the nozzle and adapted to be operatively connected with a movable driven member on such motor vehicle, for reciprocating the nozzle.

3. In a mechanism of the class described, the combination of a nozzle reciprocatingly mounted and provided with supporting means adapted to be attached to the wind shield of an automobile to position said nozzle to discharge a current of air against and at an angle with respect to the surface of said wind shield, a casing having an air passage communicating with said nozzle and provided with an air inlet communicating with the interior of the casing, a rotary fan mounted in said casing, means for automatically reciprocating the nozzle, and means for rotating the fan.

4. In a mechanism of the class described, the combination with a wind shield of a motor vehicle of a reciprocating nozzle pivotally mounted on the vehicle to discharge a current of air against and at an angle with respect to the adjacent surface of such wind shield, means for forcing a current of air through the nozzle, and means for automatically reciprocating the nozzle, to cause the current of air to strike against different portions of the surface of the wind shield progressively.

5. In a mechanism of the class described, the combination of a reciprocating nozzle, means for supporting said nozzle upon and in movable relation to a wind shield of an automobile, a casing forming an air compartment, said casing having an air inlet communicating with said air compartment, a rotary fan mounted in said casing for forcing a current of air through the nozzle, driving mechanism operatively connected with said fan, and nozzle-operating mechanism operatively connected with the nozzle and operatively connected with and adapted to be operated by said fan-driving mechanism, for reciprocating the nozzle.

6. In a mechanism of the class described, the combination of a reciprocating nozzle, a casing connected with said nozzle and forming an air compartment with which the nozzle communicates, means for detachably securing said casing and nozzle in operative position upon the glass wind shield of an automobile, a shaft rotatively mounted and extending transversely through the air compartment in said casing, a fan fixed to said shaft and located inside of said casing, means for rotating said shaft, and means for reciprocating the nozzle.

7. In a mechanism of the class described, the combination of a reciprocating nozzle provided with supporting means adapted to be attached to a wind shield of a motor vehicle to position said nozzle to discharge a current of air against and at an angle with respect to the surface of said wind shield, said supporting means comprising a casing having an air passage communicating with the nozzle and provided with an air inlet communicating with the interior of the casing, a shaft rotatively mounted and extending through and forming a support for said casing, and adapted to permit the casing and nozzle to be rocked upon an axis formed by said shaft, a fan mounted inside of said casing and fixed to said shaft, means for rotating said shaft, and means for rocking the casing and nozzle with respect to the shaft on which they are supported.

8. In a mechanism of the class described, the combination of a casing forming an air compartment and provided with a nozzle communicating with the interior of said casing and adapted to discharge a current of air against the surface of an automobile wind shield, a bracket adapted to be detachably mounted on the wind shield, a shaft rotatively mounted in said bracket and extending through and forming a support for said casing, a fan mounted inside of said air compartment in the casing and fixed to said shaft, means for driving the shaft, means for admitting air to the inside of the casing, and gear mechanism operatively connected with the casing and operatively connected with and adapted to be driven by the shaft-driving means, for reciprocating the casing and nozzle.

9. In a mechanism of the class described, the combination of a casing forming an air passage and provided with a projecting nozzle communicating with the interior of said casing, a bracket adapted to be detachably mounted on a wind shield of an automobile and adapted to support said casing and nozzle in movable operative position with respect to the wind shield, a shaft rotatively mounted in said bracket and extending through and forming a pivotal support for said casing and nozzle, a fan mounted inside of said casing and fixed to said shaft, a flexible shaft operatively connected with said fan-supporting shaft and adapted to be connected with a source of power, and gear and pitman mechanism operatively connected with said casing and operatively connected with and adapted to be operated by said flexible shaft, for reciprocating the casing and nozzle upon the axis formed by said fan-supporting shaft.

10. In a mechanism of the class described, the combination of a casing forming an air compartment having an air inlet, and provided with a projecting nozzle communicating with said air compartment, a bracket adapted to be detachably mounted upon a wind shield of an automobile, a shaft journaled in said bracket and extending through and forming a support for said casing and nozzle, a rotary fan mounted inside of said casing and operatively connected with said shaft, driving gear mechanism operatively connected with said shaft, a flexible driving shaft connected with said gear mechanism and adapted to be connected with a moving driven part of an automobile engine, the connecting means between said shaft and said mechanism including a worm rotatively mounted in said bracket and connected with said flexible shaft, a worm wheel rotatively mounted and in toothed engagement with said worm, and a connecting rod forming a connection between said worm wheel and said casing, for reciprocating the casing and nozzle.

11. In a mechanism of the class described, the combination of a casing forming an air compartment having an air inlet and provided with a discharge opening adapted to discharge a current of air against the surface of a wind shield of an automobile, a bracket adapted to be mounted upon said wind shield, a shaft journaled in said bracket and extending through and forming a support for said casing and adapted to permit the reciprocation of the casing upon the axis formed by said shaft, a rotary fan mounted in said casing and fixed to said shaft and adapted to force a current of air against the surface of said wind shield, flexible driving shaft mechanism connected with said fan supporting and driving shaft and adapted to be operatively connected with a driven member of the automobile driving mechanism, and means for reciprocating the casing upon the axis formed by the fan-supporting shaft.

Signed at Chicago, in the county of Cook and State of Illinois, this 11th day of February, 1921.

LOUIS L. KORACH.

Witnesses:
HARRY I. CROMER,
HILDUR E. WICKSTROM.